May 26, 1970   A. W. PENNEY, JR   3,514,704
PICOSECOND ENERGY SOURCE HAVING TRANSMISSION LINE COUPLING
OF NON-CRITICAL POWER SUPPLY
Filed March 3, 1967   2 Sheets-Sheet 1

INVENTOR
ALBERT W. PENNEY, JR.
BY Melvin Pearson Williams
ATTORNEY

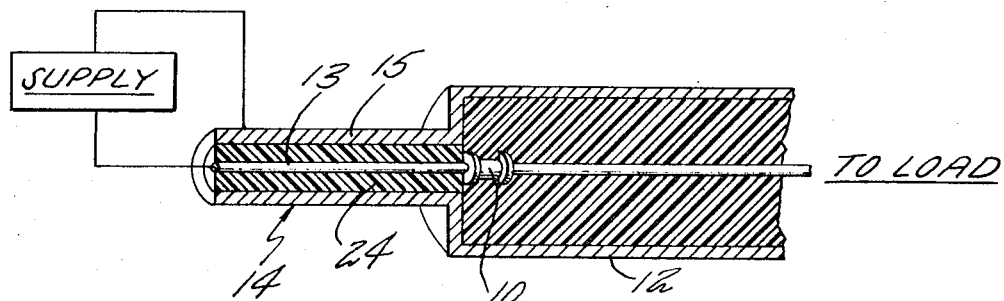
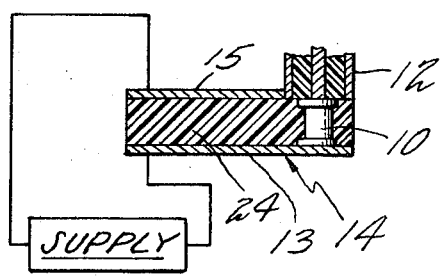
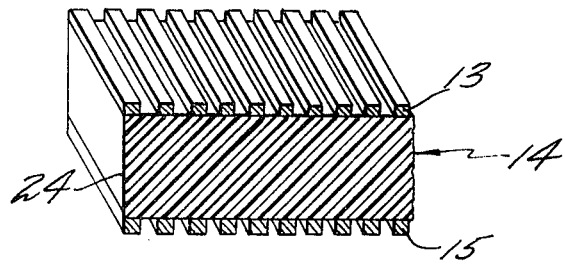
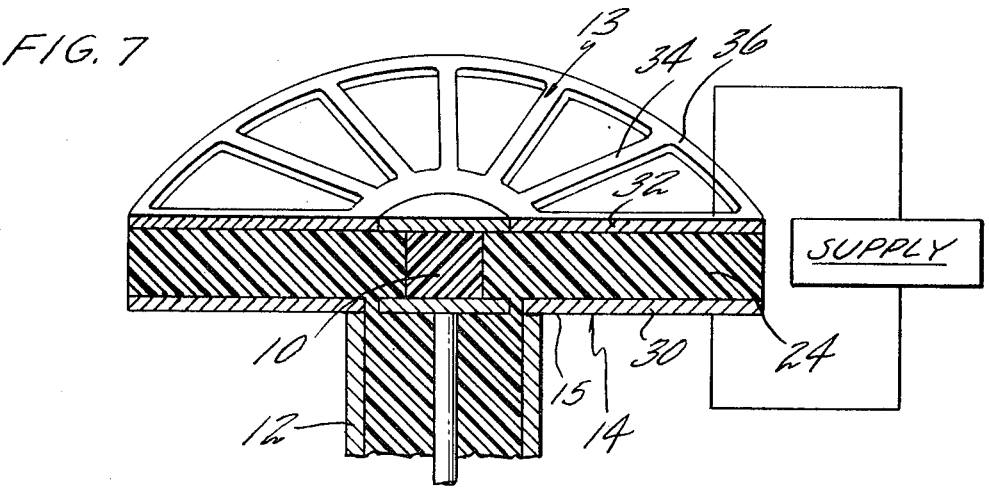

United States Patent Office 3,514,704
Patented May 26, 1970

3,514,704
PICOSECOND ENERGY SOURCE HAVING TRANS-
MISSION LINE COUPLING OF NON-CRITICAL
POWER SUPPLY
Albert W. Penney, Jr., Glastonbury, Conn., assignor to
United Aircraft Corporation, East Hartford, Conn., a
corporation of Delaware
Filed Mar. 3, 1967, Ser. No. 620,375
Int. Cl. H03k 1/00
U.S. Cl. 328—67                                11 Claims

ABSTRACT OF THE DISCLOSURE

A transmission line having a low characteristic impedance is connected through very low series inductance to a load circuitry which may include an active device capable of pulsing with a fractional nanosecond rise time. The transmission line is also connected, by non-critical means, at any source of energy, such as regular battery or DC power supply; this transmission line provides energy to the load with essentially no standing waves or oscillations notwithstanding the characteristics of the power supply.

CROSS-REFERENCES TO RELATED APPLICATIONS

A phototransducer embodying principles of this invention is disclosed and claimed in my copending application entitled Fast Transducer, Ser. No. 620,344, filed on even date herewith.

BACKGROUND OF THE INVENTION

Field of the invention

This invention relates to energy sources, and more particularly to an energy source capable of responding to load demands having signal rise times in the picosecond range.

Description of the prior art

In the prior art, the application of theoretical electronic techniques involving the highest of frequency components and involving minimal duration pulses (10 to the minus 12 seconds: picoseconds) has been limited by the need to supply power sources which are capable of supplying power to very fast devices, without the high-frequency impedance of the devices causing total system response to reflect the effect of the power supply. In other words, certain wave shapes cannot be achieved nor patterns of response measured when the frequency components are so high that the power supply cannot be connected thereto without impairing, beyond usefulness, the characteristics of the measuring or generating system.

SUMMARY OF THE INVENTION

The object of the present invention is to provide a source of power having sufficiently good high-frequency characteristics so as to enable usage thereof in picosecond circuitry without impairing overall circuit response.

According to the present invention, a low impedance transmission line is directly coupled by means having low series inductance to circuitry which is to receive energy therefrom; a power supply of a conventional sort is coupled by non-critical connections to the low impedance transmission line. The net effect of the present invention is to make a power source having good high-frequency characteristics in a combination which includes, as a principal power supply, a power supply which has inadequate high frequency characteristics. The characteristic impedance of the low impedance transmission line is very small in comparison with the characteristic impedance of the load which is deriving energy therefrom.

In accordance with further aspects of the present invention, the resulting characteristic impedance of a source over a wide range of frequencies is lowered by providing a plurality of different dielectrics; dielectrics with high dielectric constants are used, but the dielectrics have higher losses at high frequencies, so that a dielectric having a smaller dielectric constant but with very small losses at the highest frequencies are used in conjunction therewith, simultaneously, to yield an optimum broad-band system. According to an embodiment of this aspect of the invention, a plurality of transmission lines, with at least one of said transmission lines having a dielectric different than another one, are connected in parallel and operated as a single device.

Other objects, features and advantages of the present invention will become more apparent in the light of the following detailed description of preferred embodiments thereof, as illustrated in the accompanying drawings.

BRIEF DESCRIPTION OF THE DRAWINGS

FIG. 5 is a partially schematic, partially broken away, sectioned perspective of a coaxial device in accordance with the present invention;

FIG. 6 is a sectioned elevation illustrating an alternative embodiment of the circuit of FIG. 3;

FIG. 7 is a semi-schematic, sectioned elevation of a plural-line configuration of an embodiment of the present invention; and FIG. 8 is a sectioned perspective of a transmission line in accordance with a further embodiment of the present invention.

DESCRIPTION OF THE PREFERRED EMBODIMENT

Figure 1:
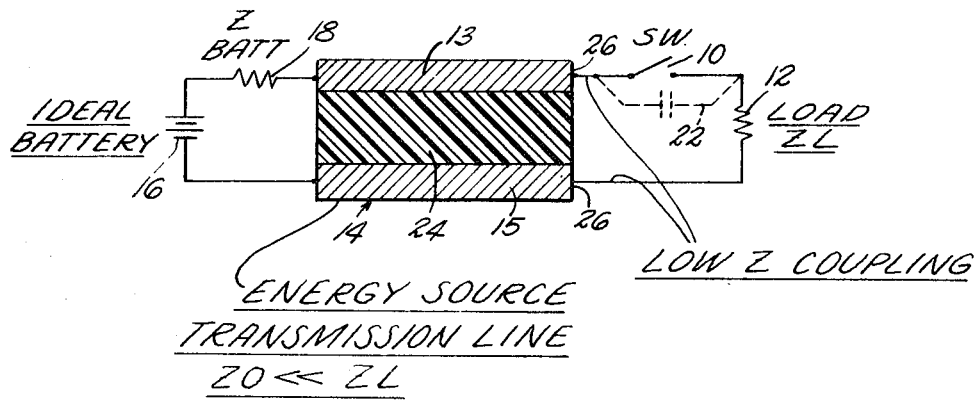
FIG. 1 is a semi-schematic, sectioned elevation of a theoretical device incorporating the present invention.

Referring now to FIG. 1, a theoretical device in accordance with the present invention provides a series connection between an active device, such as a switch 10, and a load 12 (having a characteristic impedance ZL) through a transmission line 14 which is connected to some form of power supply, represented in FIG. 1 by an ideal battery 16 and a battery impedance 18. The dotted configuration 22 illustrates that the device depicted as switch 10 usually has a parallel capacitance. When the switch 10 closes in the circuit of FIG. 1, there is initially a given potential applied to the switch through the transmission line. This potential is equal to the potential developed by the power supply 16, 18 and would represent the voltage of the battery 16 in FIG. 1. The transmission line 14 has energy stored therein in an electric field between conducting plates 13, 15. It is this energy which will be utilized to operate the circuitry 10, 12 the energy in the transmission line 14 being replenished by the power supply 16, 18 whenever the battery potential is greater than that of the transmission line. At the moment that the switch 10 is closed, the full potential of the battery is supplied to this circuitry 10, 12. At this time, a wavefront is launched down the transmission line which has a potential equal to a proportion of the battery voltage determined by the proportion of transmission line impedance (ZO) to the total impedance (ZO+ZL). This wavefront travels toward the battery with velocity equal to the velocity of electromagnetic energy propagation in the interspatial dielectric 24 of the transmission line 14. Behind the potential wavefront, the line is charged to a potential equal to battery voltage, minus the potential of the wavefront which can be expressed as:

$$V\left(1 - \frac{ZO}{ZO+ZL}\right)$$

It is important to notice that if ZL is very much larger than ZO, then this wavefront and returning wavefront will both be very small and can be made inconsequential for any application of the device by proper choice of impedance ratios.

As used herein, the load impedance 12 may be an ultimate load or a transmission line coupling the circuit to an ultimate load.

The dielectric material 24 illustrated in FIG. 1 is chosen to exhibit low dielectric losses to the high frequency components present in the Fourier representation of a signal present in the system. Exemplary materials of this type are those sold under the trademarks "Rexolite," "Rexolene" and "Teflon." On occasion, a material having a higher dielectric constant, but higher losses, may be used; an example is barium titanate. Dielectric materials having the highest dielectric constants, however, do acquire high losses above a given critical frequency. On the other hand, dielectric materials having the lower losses at high frequency have slightly lower dielectrics. In order to achieve a device which operates over a broad range of frequencies with suitable dielectric and non-prohibitive losses, several dielectric materials may be included within the interspace of a single transmission line, or several transmission lines, having different dielectric materials, may be connected in parallel. This is one of the features of the present invention. The transmission line 14 is designed so as to present a very low characteristic impedance compared to the impedance of the load. As described hereinafter, a very low impedance characteristic may be provided in a given embodiment by usage of a plurality of transmission lines connected in parallel.

In order for the power supply 16, 18 to replenish energy in the transmission line 14, a certain amount of time will be required. The charging time is determined by the total capacitance of the transmission line 14 and by the battery impedance 18. The battery impedance 18 and the capacitance of the transmission line 14 can be made sufficiently small so as to keep the replenishment time to a useful minimum.

Assuming ideal connections between the transmission line, the switch, and the load, and assuming a low impedance coupling 26 between the transmission line 14 and the remainder of the circuitry 10, 12, the current rise time when the switch is closed is limited only by the low inductive coupling circuit 26 and by the wave front propagation of the electron current (described hereinbefore). If the coupling 26 is reduced to an absolute minimum impedance, thereby achieving very low series inductance in the circuitry (which may be achieved as described hereinafter) then the current rise time is limited only by the wave front propagation through the transmission line. It is therefore, apparent that if a nearly ideal circuit arrangement is utilized, within the limitations of design of transmission lines, a sufficiently low characteristic impedance and sufficiently low losses can be achieved at the frequencies which are required, or to support rise times having frequency components as necessary, into the pico-second range.

The power supply 16, 18 can be connected anywhere in the circuit provided that it is electrically in parallel with the transmission line 14. Thus, a connection could be made between the left side of switch 10 and the bottom of load resistor 12 as viewed in FIG. 1. The reason this is possible is because energy is supplied to the circuit from the transmission line 14, and the power supply 16, 18 is used merely to replenish the energy in the transmission line 14. The theoretical circuit illustrated in FIG. 1 may assume any number of embodiments, a few of which are described in detail hereinafter in relation to FIGS. 2–7. In each of these figures, it will be noted that the characteristic impedance of the transmission line 14 is in series with the active device (such as switch 10 in FIG. 1), and this series circuit combination is connected in series with the impedance of the load 12. In each of these embodiments, the power supply 16, 18 is connected in parallel with the energy source transmission line 14, by any sort of connection which is not critical at the frequencies of the device, but need only represent a low impedance DC circuit. Note that the load impedance 12 may represent an ultimate utility device, or may represent a transmission line coupling to an ultimate utility device.

Figure 2:
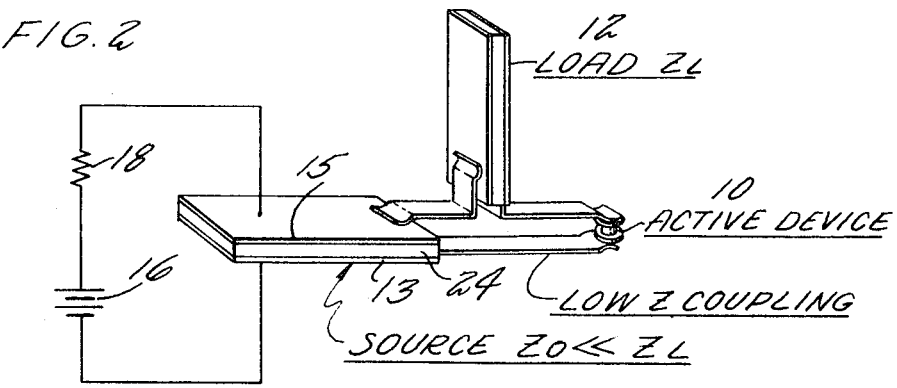
FIG. 2 is a semi-schematic perspective of an exemplary embodiment of the present invention.

Referring now to FIG. 2, the transmission lines 12, 14 are each shown as comprising strip lines including parallel conductive plates separated by dielectric material. An active device 10 is connected in series with the transmission lines 12, 14 by a low impedance coupling 26 which includes a plurality of spring plates. The spring plates comprising the low impedance coupling 26 facilitate the insertion into circuit configurations of various elements 10, 12, 14. In order to achieve a proper impedance match, the spring plates may be closer together than the thickness of the transmission lines 12, 14 or may include suitable dielectric material therebetween.

Figure 3A:
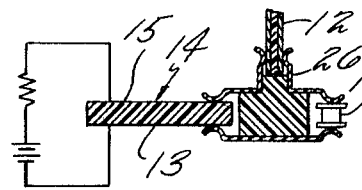
FIG. 3 is a sectioned elevation illustrating a detail of variation of the circuit of FIG. 2.
Figure 3B:
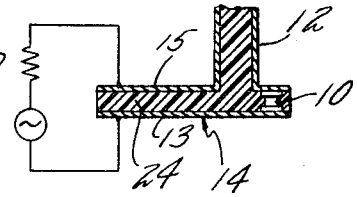
Figure 3C:
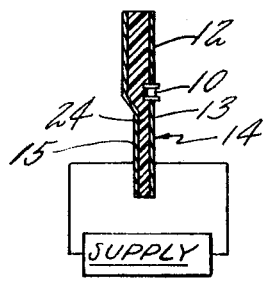

A logical progression of the embodiment of FIG. 2 is illustrated in FIGS. 3a–3c. The low impedance coupling 26 may be completely filled with dielectric thus forming a transmission line thereof. In the event that ease of circuit assembly is less significant than optimum operation, the circuit of FIG. 3a can be fabricated from only three plates, as shown in FIG. 3b, completely filled with a dielectric material, where the spacing of the plates 12 will differ from the spacing of the plates 14 so that a very high ratio of impedance of the transmsission line 12 to the impedance of the transmission line 14 may obtain. FIG. 3c illustrates that the right angle configuration is not critical and that the transmission lines 12, 14 may form a straight line, with the active device 10 connected between an otherwise common plate thereof.

FIG. 3b also illustrates that the power supply may not be a DC power supply as is illustrated in FIGS. 1, 2, and 3a, but may rather be an alternating current supply. An example of alternating current operation of the invention is to provide, at the load transmission line 12, apparatus to analyze the action of the active device 10 in response to an alternating potential of one or ten megacycles, for instance, it is important to note that the present invention provides a clean, low impedance source utilizing, as the principal energy device, a low cost, high impedance power supply (whether alternating or DC) of a run-of-the-mill variety. The advantage of the present invention will obtain equally well with an alternating current supply as with a DC supply. The difference is that, as described with respect to FIG. 1, the phenomenon to be watched is the switching action of the switch, and the action of the switch is excited by the battery. Here the phenomenon is the response of the active device 10 to the alternating potential. But none the less, the present invention does provide a high quality low impedance source at very high frequencies, as well as providing a power supply capable of driving a pulse having a rise time with frequency components in the picosecond range. Thus, FIG. 3c illustrates the power supply as a general power supply without regard to whether it is an alternating or direct current supply, and the remaining embodiments herein are similarly delimited.

Figure 4:
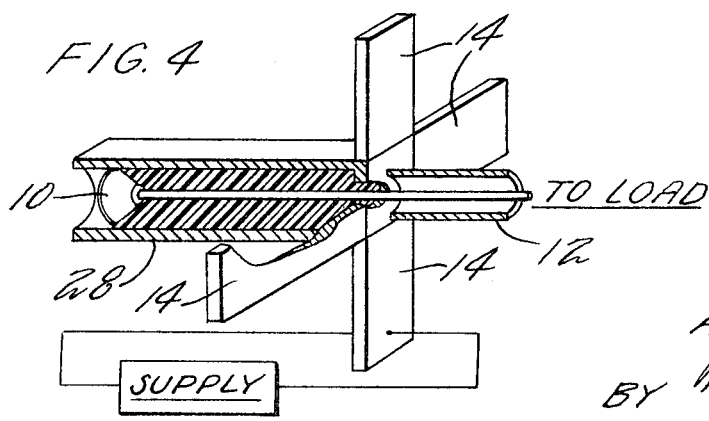
FIG. 4 is a partial sectioned perspective of a combined coaxial and flat, multiple transmission line, series connected device in accordance with the present invention.

Another embodiment of the present invention, illustrated in FIG. 4, includes four low impedance transmission lines 14, which are connected in the form of a cross with a coaxial load transmission line 12 intersecting therewith at the junction thereof. An additional transmission line 28 connects active device 10 to the junction of the low impedance transmission lines 14 on one side, and the central conductor of the transmission line 28 is contiguous with the central conductor of the load transmission line 12. This places all four transmission lines 14 in series with the active device 10 and the transmission line 12. The provision of plural transmission lines 14 aids in achieving a very low characteristic impedance for the energy source. The configuration illustrated in FIG. 4 is similar to the arrangement of a high-speed phototransducer illustrated in my aforementioned copending application, wherein the active element 10 comprises a photodiode; in said copending application, the transmission lines 14 are folded to the left (as seen in FIG. 4 herein) so that they lie contiguous with the common outer conducting element of the transmission line 28.

A purely coaxial embodiment is illustrated in FIG. 5, wherein the active element 10 is in series with central conductors of both transmission lines 12, 14 and the outer conductors of the transmission lines 12, 14 are contiguous; the different size illustrated in FIG 5 for the different transmission lines 12, 14 is illustrative of the fact that the characteristic impedance of the power source transmission line 14 must be quite low relative to the load impedance 12.

FIG. 6 illustrates another version of a combination strip type and coaxial transmission line, where the power source transmission line 14 comprises a strip with a coaxial load transmission line 12 in abutment therewith, the active device 10 being in contact with one side of the transmission line 14 and with the center conductor of the transmission line 12, the other side of the transmission line 14 being in contact with the outer conductor of the transmission line 12. Again it is seen that the transmission line 14 comprises a series impedance between the active device 10 and the impedance of the load 12.

A circuit capable of achieving very high impedance ratios between the energy source transmission line 14 and the load impedance 12 is illustrated in FIG. 7. Wherein, the energy source transmission line 14 is comprised of a pair of coplanar spoked-wheel type of structures, the encompassed volume of which is completely filled with dielectric. This structure may be fabricated from a pair of discs separated by dielectric, wherein the configuration of a spoked wheel may be etched thereon through well known circuit etching techniques. Actually, transmission line 14 illustrated in FIG. 7 comprises a plurality of parallel-transmission lines, each transmission line being formed by one spoke of one of the planes together with an adjacently-disposed spoke in the other plane. Thus, the spokes 30, 32 form a transmission line together with a concomitant mass of the dielectric therebetween. Note that adjacent spokes 32, 34 may be interconnected at the periphery of the device, such as by the segment 36, without adversely affecting the transmission line structure of a pair of spokes 30, 32. When the width of the rim-light peripheral strip is something less than the width of the spokes, then the effect of the peripheral strip is merely to conduct energy away from the end of each transmission line towards another transmission line, but as any one wave launched on one transmission line will be traveling at the same velocity, when these waves reach the peripheral strip and travel there along, each wave will meet an identical wave coming from the opposite direction; in other words, equal potential points are obtained at the point where any individual transmission line must consider to end and another one begin. This being so, the net effect of the peripheral conducting portion is to make each transmission line look just slightly longer than it would without, so that more energy can be stored, and the time between the minor reflections which do occur will be greater. This is advantageous, as described elsewhere herein. The circuit of FIG. 7 differs markedly from a similar circuit which would include only discs, without the spokes etched thereon. In the case of discs, the equivalent of an infinite number of differentially spaced transmission lines is provided; however, each of these differentially spaced transmission lines is of a pie-shaped configuration so that the characteristic impedance varies radially outward from the center of the structure. By providing individual spokes 30, 32, 34, the current densities are controlled so as to achieve the same effect as with parallel line, strip or coaxial type transmission lines.

In order to achieve lowest possible characteristic impedances, the effect of current concentrations may be mitigated in strip-type transmission lines as illustrated in FIG. 8. In FIG. 8, small slots with good square edges have been properly etched in the metallic surfaces 13, 15 of the transmission line 24. This provides edges for the conduction of the electromagnetic wave, which would otherwise tend to pile up at the extreme right and left edges (as seen in FIG. 8) of the metallic surfaces 13, 15 due to a wave concentration effect of high frequency electromagnetic propagation. Instead of concentrating electromagnetic waves at the right and left edges of the transmission line 14, this distributes the electromagnetic waves more uniformly amongst the plurality of portions in the surfaces 13, 15 which are formed by the etching. The net result is lower impedance in the transmission line 14.

Although the invention has been shown and described with respect to preferred embodiments thereof, it should be understood by those skilled in the art that various changes and omissions in the form and detail thereof may be made therein without departing from the spirit and the scope of the invention.

Having thus described exemplary embodiments of my invention, what I claim as new and desire to secure by Letters Patent of the United States is:

1. An electric circuit in which power from a source is supplied to a load through an electric circuit device operating with signal rise times in the picosecond regime, comprising:

a load impedance;

a transmission line having a characteristic impedance very much larger than the impedance of said load;

an active triggering device connected in series circuit relationship with said load impedance across respective terminals of said transmission line so that the characteristic impedance of said transmission line is connected in a series loop with said triggering device and said load impedance;

and a power supply connected to respective terminals of said transmission line at another end thereof, whereby the power supply and the characteristic impedance of said transmission line form a first series loop, the load impedance, triggering device, and characteristic impedance of said transmission line form a second series loop, the two series loops being interconnected through the characteristic impedance of said transmission line.

2. The device described in claim 1 wherein said transmission line is coaxial, and wherein the load impedance comprises a second coaxial transmission line, said active element being serially connected between center conductors of said transmission lines, the outer conductors of said transmission lines being interconnected in series.

3. The device described in claim 1 wherein said transmission line comprises a strip line including a pair of spaced apart parallel plates with dielectric filling the region encompassed thereby.

4. The device described in claim 3 wherein said load impedance comprises a transmission line.

5. The device described in claim 4 wherein said load impedance transmission line comprises a strip line.

6. The device described in claim 1 wherein said transmission line comprises a plurality of transmission line segments connected in parallel.

7. The device described in claim 6 wherein said transmission line segments are radially disposed about a common axis, and connected in parallel at the axial end thereof.

8. The device described in claim 7 wherein said segments are connected in parallel at the peripheral end thereof.

9. The device described in claim 1 wherein said transmission line comprises a plurality of conducting elements disposed in mutually opposed parallel relationship in a pair of parallel planes, the conducting elements in each plane being separated from like elements in the other plane by a dielectric.

10. The power source described in claim 1 wherein said transmission line comprises a plurality of transmission line elements connected in parallel, each of said elements having a different dielectric constant than the others.

11. The power source described in claim 1 wherein said transmission line comprises a plurality of transmission line elements connected in parallel, one of said transmission lines having a different dielectric material than another one of said transmission lines.

References Cited

UNITED STATES PATENTS

| | | | |
|---|---|---|---|
| 2,496,979 | 2/1950 | Blumlein | 328—67 X |
| 2,511,610 | 6/1950 | Wheeler | 333—96 X |
| 2,697,784 | 12/1954 | Blythe | 328—67 |
| 2,769,149 | 10/1956 | Clogston | 333—96 X |
| 2,769,147 | 10/1956 | Black et al. | 333—96 X |
| 2,837,638 | 6/1958 | Frink | 328—67 |

DONALD D. FORRER, Primary Examiner

R. C. WOODBRIDGE, Assistant Examiner

U.S. Cl. X.R.

250—211; 307—246, 317; 333—84, 96